Nov. 15, 1966

ROKURO KAMIYA 3,286,206

ACTIVE CR TWO-TERMINAL CIRCUIT

Filed Feb. 27, 1964

2 Sheets-Sheet 1

INVENTOR.
Rokuro Kamiya
BY
Hill, Sherman, Meroni, Gross & Simpson
ATTORNEYS

INVENTOR.
Rokuro Kamiya
BY
Hill, Sherman, Meroni, Gross & Simpson
ATTORNEYS

United States Patent Office 3,286,206

Patented Nov. 15, 1966

3,286,206

ACTIVE CR TWO-TERMINAL CIRCUIT

Rokuro Kamiya, Ohta-ku, Tokyo, Japan, assignor to Kabushikikaisha Taiko Denki Seisakusho (Taiko Electric Works Ltd.), Tokyo, Japan, a corporation of Japan Filed Feb. 27, 1964, Ser. No. 347,746

Claims priority, application Japan, Apr. 24, 1963, 38/21,658

9 Claims. (Cl. 333—80)

This invention relates to an active capacitance-resistance (CR) two-terminal circuit which forms a filter, an equalizer and the like through the use of a capacitive element C, a resistor R and a negative impedance conversion circuit NIC but without using an inductance element.

A filter, an equalizer or the like using an active CR two-terminal circuit in place of an inductance element is small in size, light in weight and particularly suitable for use in a transistor circuit.

One object of this invention is to provide an active CR two-terminal circuit using a resistance element, a capacitance element and a negative impedance conversion circuit instead of an amplifier and having the same characteristics (hereinafter referred to as general characteristics) as those of a passive two-terminal circuit composed of an inductance element, a capacitance element, a resistance element and a transformer.

Another object of this invention is to provide an active CR two-terminal circuit having the general characteristics collectively in which a plurality of partial active CR two-terminal impedance circuits are connected in parallel, each being composed of a resistance element, capacitance element and a negative impedance conversion circuit.

A further object of this invention is to provide an active CR two-terminal circuit having the general characteristics collectively in which a plurality of partial active CR two-terminal admittance circuits are connected in series, each being composed of a resistance element, a capacity element and a negative impedance conversion circuit.

A yet further object of this invention is to provide a partial active CR two-terminal impedance or admittance circuit such as the aforementioned one which is simple in structure and employs a resistance element, a capacity element and one negative impedance conversion circuit.

Other objects, features and advantages of this invention will become apparent from the following description taken in conjunction with the accompanying drawings, in which.

Figure 1:
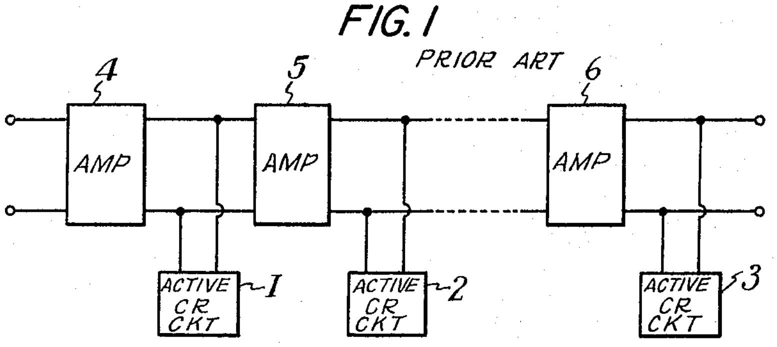
FIGURE 1 is a block diagram, for explaining an active CR two-terminal circuit heretofore employed.

Referring to FIG. 1 there is depicted an active CR two-terminal circuit of a conventional construction including active CR circuits 1, 2 . . . 3 are concatenated through amplifiers 4, 5 . . . 6 as shown and which has its impedance transmission amount equal to the product of the impedance transmission amount of the respective active CR circuits 1, 2 . . . 3. In such a system, however, it is required that the input impedance of the amplifiers to be far higher than the impedance of the respective active CR circuits. Therefore, there results a large transmission loss and it is necessary to increase the gain of the amplifiers, which results in increased noise and linear distortion and causes the circuit to be unstable and expensive.

The present invention is intended to provide an active CR two-terminal circuit in which the aforementioned disadvantages may completely be removed.

Now, I will define the transmission amount of an impedance circuit and explain one example of the connection of the active CR two-terminal circuit using amplifiers heretofore employed and thereafter explain the principle and connection of the active CR two-terminal circuit according to this invention.

Figure 2:
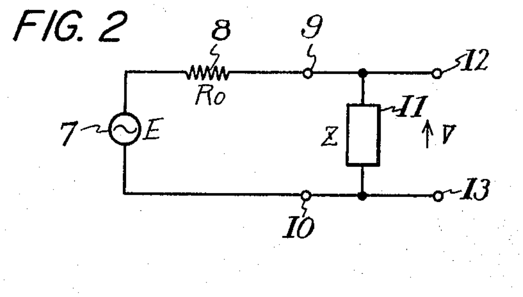
FIGURE 2 is a fundamental diagram illustrating a filter, an equalizer or the like formed by connecting a two-terminal impedance to a constant-current power source.

Referring now to FIG. 2, when a two-terminal impedance circuit 11 having an impedance value Z is connected between constant-current power source terminals 9 and 10, which are provided with in series a voltage source 7 having a voltage value E and an internal resistance element 8 of the voltage source generally having a high resistance value $R_0$, the voltage V between terminals 12 and 13 of the two-terminal impedance circuit 11 is given by the following formula:

$$V=\frac{ZE}{Z+R_0}\doteq\frac{Z}{R_0}E \qquad (1)$$

Accordingly, if the voltage V is taken as the output voltage, the transmission amount T of the impedance circuit 11 is expressed as follows:

$$T=\frac{E}{V}=\frac{R_0}{Z} \qquad (2)$$

and by suitably selecting the value Z of the impedance circuit 11, a filter, an equalizer or the like may be formed. The transmission amount T of the impedance circuit 11 is given by the following formula which has been solved into secondary factors. That is $$T=\frac{R_0}{Z}=\prod_{m=1}^{n}\frac{p^2+b_{m1}p+b_{m2}}{p^2+a_{m1}P+a_{m2}} \qquad (3)$$

where $p=j\omega$, $\omega$ is angular velocity, $a_{m1}$, $a_{m2}$, $b_{m1}$ and $b_{m2}$ are coefficients and positive real numbers, these factors having no roots with positive real parts to $p$. With reference to the above Formula 3, refer to, for example, "The Bell System Technical Journal," September 1959, pages 1269–1316, especially page 1295.

As is apparent from the aforementioned magazine and my paper (No. 61) in the 1963 year's general meeting of the Four Institutes of Electrical Engineers of Japan, the method is known such that the secondary factors in the above Formula 3 are obtained by an active CR circuit using a capacity element, resistance element and negative impedance conversion circuit, instead of giving the factors as a passive two-terminal network using an inductance element, a capacity element, a resistance element and a transformer. However, such method is usual for obtaining the respective factors of the second order (secondary factors) in the Formula 3, but in order to obtain the impedance Z of higher order, namely the Formula 3, the conventional active CR two-terminal circuit as described above in FIGURE 1 is formed in a manner so that each of the secondary active CR two-terminal circuits 1, 2 . . . 3 corresponding to the respective factors of the second order in the Formula 3 is connected respectively through the amplifiers 4, 5 . . . 6 and its whole transmission amount is to be the product of the transmission amount of the respective active CR circuits 1, 2 . . . 3. However, thus formed circuit has disadvantages such as the aforementioned ones.

Figure 3:
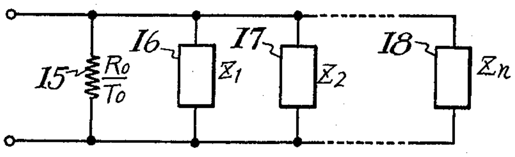
FIGURE 3 is a schematic diagram of an active CR two-terminal circuit formed by connecting in parallel partial active CR two-terminal impedance circuits in accordance with the present invention.

In the present invention, the transmission amount T of the impedance circuit 11 is expressed in the form of the sum of partial fractions of the second or lower order instead of the product of factors of the second order as in FIGURE 3, and these respective partial fractions are formed by active CR two-terminal circuits, forming an active CR two-terminal circuit of higher order as a whole. The Formula 3 may be expressed in the form of the sum as follows, $$T=\frac{R_0}{Z}=T_0+p\sum_{m=1}^{n}\frac{\beta_{m1}p+\beta_{m2}}{p^2+a_{m1}p+a_{m2}} \tag{4}$$

where $$T_0=\prod_{m=1}^{n}\frac{b_{m2}}{a_{m2}} \tag{5}$$

and it is a positive number, and $\beta_{m1}$ and $\beta_{m2}$ are coefficients determined by comparing the Formulas 3 and 4 and they are positive or negative real numbers.

Accordingly, if the respective terms of the Formula 4 can be obtained by the active CR two-terminal circuit, an active CR two-terminal of higher order can be obtained by connecting in parallel the partial active CR two-terminal circuit 16, 17 . . . 18 and a resistance element 15 of the value $R_0/T_0$ as illustrated in FIGURE 3.

If now the respective terms of the sum of the Formula 4 is rewritten as follows, with the suffixes omitted for the sake of simplicity, $$\frac{1}{z}=\frac{1}{R_0}\frac{p(\beta_1p+\beta_2)}{p^2+a_1p+a_2} \tag{6}$$

the denominator of the Formula 3 sometimes becomes a mere negative real root, a complex root having a negative real part, or an imaginary root alone. I will hereinbelow explain the above cases $(a_1^2>4a_2)$.

(1) In the case of the negative real root:

Let the two roots be $-\gamma_1$ and $-\gamma_2$, $$\frac{R_0}{z}=\frac{A_1p}{p+\gamma_1}+\frac{A_2p}{p+\gamma_2}$$

Hence, it is sufficient merely to consider $$z=\frac{R_0}{A}\left(1+\frac{\gamma}{p}\right) \tag{7}$$

and the partial active CR two-terminal impedance is obtained by a series circuit of a resistance element having a value $$R_1=\frac{1}{A}R_0$$

and a capacity element having a value $$C_1=\frac{A}{R_0}$$

Figure 4A:
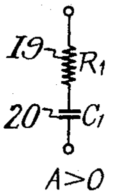
FIGURES 4A and 4B are circuit diagrams illustrating an example of the partial active CR two-terminal circuit to be employed in the active CR two-terminal circuit according to this invention.

Accordingly, when A is positive, a series circuit is formed which is composed of a resistance element 19 having a value $R_1$ and a capacity element 20 having a value $C_1$ as illustrated in FIGURE 4A.

Figure 4B:
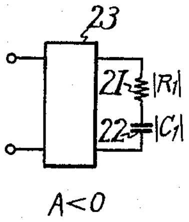

When A is negative, it may be formed as shown in FIG. 4B in the form of a negative impedance circuit by connecting a negative impedance conversion circuit 23 to the both ends of a series circuit of a resistance element 21 of a value $R_1$ and a capacity element 22 of a value $C_1$.

(2) In the case of a complex root $(a_1<4a_2)$.

The Formula 3 may be rewritten as follows:

$$z=R_0\frac{p^2+a_1p+a_2}{p(\beta_1p+\beta_2)}$$
$$=\frac{1}{\beta_1}R_0+\frac{a_2R_0}{\beta_2p}-\frac{\beta_1}{\beta_2}\cdot\frac{KR_0}{\beta_1p+\beta_2} \tag{8}$$

where $$K=\left(\frac{\beta_2}{\beta_1}\right)^2-a_1\frac{\beta_2}{\beta_1}+a_2 \tag{9}$$

The first term of the Formula 8 is a resistance element having a value $$R_2=\frac{R_0}{\beta_1}$$

the second term is a capacity element having a value $$C_2=\frac{\beta_2}{a_2R_0}$$

and the third term may be obtained by a parallel connection of a resistance element having a value $$R_3=-\frac{\beta_1}{\beta_2^2}KR_0$$

and a capacity element having a value $$C_3=-\frac{\beta_2}{KR_0}$$

Figure 5:
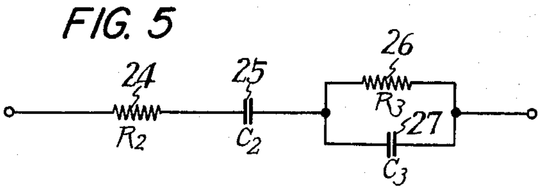
FIGURE 5 is a circuit diagram illustrating another type of the partial active CR two-terminal circuit to be employed in the active CR two-terminal circuit according to this invention.

Accordingly the partial active two-terminal impedance in this case may be obtained by connecting in series a parallel circuit composed of a resistance element 26 of a value $R_3$ and a capacity element 27 of $C_3$ to a series circuit consisting of a resistance element 24 having a value $R_2$ and a capacity element 25 of $C_2$ as shown in FIGURE 5. If $$p=-\frac{\beta_2}{\beta_1}$$

in the Formula 6, the Formula 9 is the same as the denominator of the Formula 6, so that the Formula 9 is always positive irrespective of whether $\beta_2/\beta_1$ is positive or negative. Consequently the resistance elements 24 and 26 and the capacity elements 25 and 26 become positive or negative due to the sign of $\beta_1$ and $\beta_2$.

(a) When $\beta_1>0$ and $\beta_2>0$, it follows that $$R_2>0,\ R_3<0,\ C_2>0 \text{ and } C_3<0$$

Figure 6A:
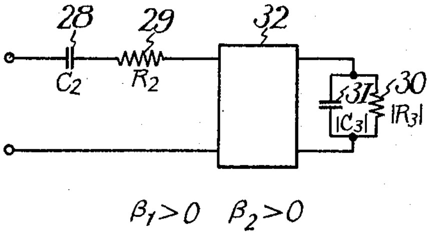
FIGURES 6A to 6D are circuit diagrams illustrating a further example of the partial active CR two-terminal circuit to be employed in the active CR two-terminal circuit according to this invention.

Therefore, a partial active CR two-terminal circuit may be obtained by connecting a series circuit of a resistance element of a value $R_2$ and a capacity element 28 of $C_2$ in series to a negative impedance that the both ends of a parallel circuit of a resistance element 30 having a value $R_3$ and a capacity element 31 having a value $C_3$ have been connected to a negative impedance circuit 32 as illustrated in FIGURE 6A.

(b) When $\beta_1<0$ and $\beta_2<0$, it follows that $$R_2<0,\ R_3>0,\ C_2<0 \text{ and } C_3>0$$

Figure 6B:
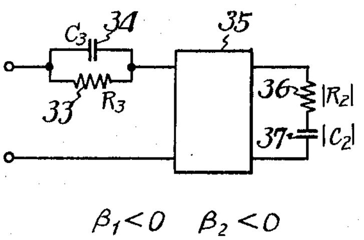

Therefore, a partial active CR two-terminal circuit may be obtained by connecting a parallel circuit of a resistance element 33 of a value $R_3$ and a capacity element 34 of a value $C_3$ in series to a negative impedance circuit that a series circuit of a resistance element 36 of a value $|R_2|$ and a capacity element 37 of a value $|C_2|$ has been converted into a negative impedance by a negative impedance circuit 35 as shown in FIGURE 6B.

(c) When $\beta_1>0$, and $\beta_2>0$, it follows that $$R_2>0,\ R_3<0,\ C_2<0 \text{ and } C_3>0$$

Figure 7A:
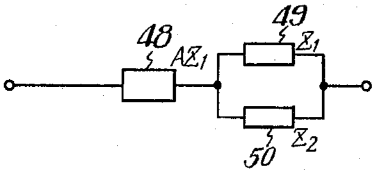
FIGURES 7A and 7B are circuit diagrams for explaining the circuit relationship which is necessary for simplification of the active CR two-terminal circuit of this invention.
Figure 7B:
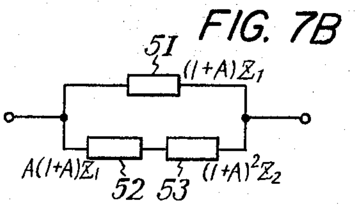

A partial active two-terminal impedance circuit such as shown in FIGURE 5 may not be obtained by using one negative impedance conversion circuit alone. However, a two-terminal impedance circuit that an impedance element 48 of a value $AZ_1$ with A being a positive real number has been connected in series to a parallel circuit composed of an impedance element 49 of a value $Z_1$ and an impedance element 50 of a value $Z_2$ as illustrated in FIGURE 7A, is equivalent to a two-terminal impedance circuit that an impedance element 51 having a value $(1+A)Z_1$ has been connected in parallel to a series circuit consisting of an impedance element 52 of a value $A(\frac{1}{2}+A)Z_1$ and an impedance element 53 of a value $(1+A)Z_2$. (Refer to page 560 of "Tele-Communication Engineering Handbook," published by Maruzen Kabushikikaisha, Japan, on July 10, 1957.) Accordingly, if we put $$A=\frac{C_3}{C_2}=-\frac{a_2}{K} \tag{10}$$

the capacity elements 25 and 27 and the resistance elements 26 in FIGURE 5 may respectively be made to correspond to the impedance elements 48, 49 and 50 in FIGURE 7A, and the values of the impedance elements 51, 52 and 53 in FIGURE 7B are as follows:

$$C_2'=\frac{1}{1+A}C_3=-\frac{\beta_2}{(K-a_2)R_0}$$

$$=\frac{\beta_1^2}{a_1\beta_1-\beta_2}\cdot\frac{1}{R_0}>0$$

$$C_3'=\frac{1}{A(1+A)}C_3=-\frac{K}{a_2R_0}\cdot\frac{\beta_1^2}{a_1\beta_1-\beta_2}<0$$

$$R_3'=(1+A)^2R_3=-\frac{1}{\beta_1^3}\cdot\frac{(a_1\beta_1-\beta_2)^2}{K}R_0>0$$

Figure 6C:
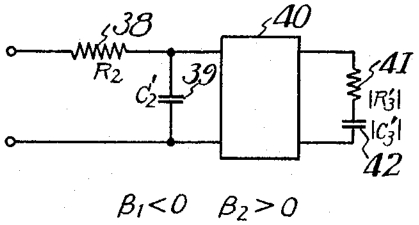

In the above formulas the impedances corresponding to the elements 52 and 53 are negative. Hence, by connecting the resistance element 38 of a value $R_2$ in series to a circuit that the series circuit of the resistance element 41 of a value $|R_3'|$ and the capacity element 42 of a value $|C_3'|$ has been connected to the negative impedance conversion circuit 40 to be converted to a negative impedance circuit, to which has been connected in parallel the capacity element 39 as shown in FIGURE 6C, a desired partial active CR two-terminal circuit may be formed by the use of one negative impedance conversion circuit alone.

(d) When $\beta_1<0$, and $\beta_2>0$, it follows that $$R_2<0,\ C_2>0,\ R_3>0,\ \text{and}\ C_3<0$$

Also in this case, a negative impedance conversion circuit may not be obtained as in the case of (c). If, however, we put $$A=\frac{R_2}{R_3}=-\frac{\beta_2^2}{\beta_1^2}\cdot\frac{1}{K}$$

the resistance elements 24 and 26 and the capacity element 27 in FIGURE 5 may be made to correspond to the impedance elements 48, 49 and 50 in FIGURE 7A, and the values of the impedances elements 51, 52 and 53 in FIGURE 7B are as follows:

$$R_2''=(1+A)R_3=\frac{a_1\beta_2-a_2\beta_1}{\beta_2^2}R_0<0$$

$$R_3''=A(1+A)R_3=-\frac{a_1\beta_2-a_2\beta_1}{\beta_1^2K}R_0<0$$

and $$C_3''=\frac{C_3}{(1+A)^2}=-\frac{K\beta_2\beta_1^2}{(a_2\beta_1-\beta_2a_1)^2R_0}<0$$

Figure 6D:
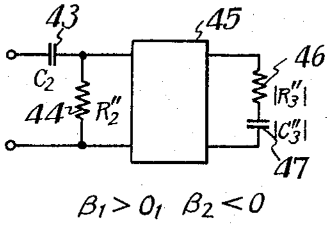

In the above formulas the impedance corresponding to the elements 52 and 53 are negative. Hence, by connecting a capacity element of a value $C_2$ in series to a circuit that a series circuit composed of a resistance element 46 of a value $|R_3''|$ and a capacity element 47 of a value $|C_3''|$ has been connected to a negative impedance conversion circuit 45 to be converted to a negative impedance circuit, to which has been connected in parallel a resistance element 44 of a value $R_2''$ as shown in FIGURE 6D, a desired partial active CR two-terminal circuit may be formed through the use of one negative impedance conversion circuit.

(3) In the case of imaginary roots alone. This is a case such that the real parts of the complex roots in the above item (2) are zero, and a partial active CR two-terminal impedance circuit may also be formed as in the item (2).

From the foregoing explanations, partial active CR two-terminal impedance circuits corresponding to the partial fractions of the respective terms of the Formula 4 may be formed by using a positive resistance element, a positive capacity element and a negative impedance conversion circuit, independently of whether the sign of $\beta_1$ and $\beta_2$ are positive or negative. In any case, accordingly it is possible to form a two-terminal impedance circuit having general characteristics by connecting in parallel the resistance element 15 having a value $R_0/T_0$ and the partial active CR two-terminal impedance circuits 16, 17 . . . 18 corresponding to the partial fractions of the respective terms in the Formula 4. Consequently, although the conventional active CR two-terminal impedance circuit such as shown in FIGURE 2 requires an amplifier, the active CR two-terminal impedance circuit of this invention has advantages in that no amplifier is required and there is not caused noise, linearity distortion and unstability due to such amplifier, and further it is economical.

The active CR two-terminal circuits 1, 2 . . . 3 in FIGURE 1 and the partial active CR two-terminal circuits 16, 17 . . . 18 in FIGURE 3 are quite different in their circuit constants, and the active CR two-terminal circuits 1, 2 . . . 3 in FIGURE 1 respectively include an element corresponding to the resistance element 15 having a value $R_0/T_0$ in FIGURE 3.

Figure 8:
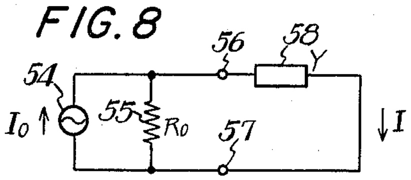
FIGURE 8 is a fundamental diagram for forming a filter, an equalizer or the like by connecting a two-terminal admittance to a constant-voltage power source.
Figure 9:
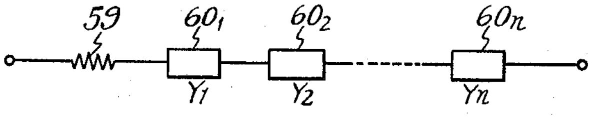
FIGURE 9 is a schematic diagram of the active two-terminal circuit of this invention formed by connecting in series admittances.

The foregoing has been made in connection with an example in which such a constant current power source as illustrated in FIGURE 1 was used, but in like manner a two-terminal circuit may also be composed of capacity elements, resistance elements and negative conversion elements due to the dual principle when using a constant voltage source such that an internal impedance element 55 of an extremely low value $R_0$ is connected in parallel to a current power source of a value $I_0$ and both ends 56 and 57 of the internal impedance element 55 are used as output terminals as illustrated in FIGURE 8. That is, a two-terminal admittance circuit 58 of a value Y is connected to the terminals 56 and 57. In this case the impedance in the above explanation is used as an admittance (the partial active CR impedances corresponding to the respective partial fractions are also used as the respective partial active CR admittances), $p$ is replaced by $1/p$ and a resistance element 59 and admittance circuits 60, 61 . . . 62 are connected in series as illustrated in FIGURE 9, by which a desired active CR two-terminal admittance circuit may be formed.

It will be apparent that many modifications and variations may be effected without departing from the scope of the novel concept of this invention.

What is claimed is:

1. An active CR two-terminal circuit comprising a plurality of partial two-terminal impedance circuits at least one of which is composed of resistance elements, capacitance elements and a negative impedance conversion circuit, said partial two-terminal impedance circuits, being connected directly in parallel, a resistance circuit which is directly connected in parallel to said partial two-terminal impedance circuits, thereby forming a two-terminal impedance circuit having a value of impedance Z, output terminals connected across said partial two terminal impedance circuit, and a constant current voltage electrical source having an internal resistance $R_0$ far higher than said impedance Z, said constant current voltage electrical source being connected across said partial two-terminal impedance circuit in which $$\frac{R_0}{Z}=\prod_{m=1}^{n}\frac{b_{m2}}{a_{m2}}+p\sum_{m=1}^{n}\frac{\beta_{m1}p+\beta_{m2}}{p^2+a_{m1}p+a_{m2}} \quad (1)$$

where $p=j\omega$, $\omega$ being angular velocity, $a_{m1}$, $a_{m2}$, $b_{m2}$, $\beta_{m1}$ and $\beta_{m2}$ being respectively coefficients, said resistance circuit having a value of $$\frac{R_0}{\prod_{m=1}^{n}\frac{b_{m2}}{a_{m2}}}$$

and each of said plurality of partial two-terminal impedance circuits having a value of $$\frac{R_0(p^2+a_{m1}p+a_{m2})}{p(\beta_{m1}p+\beta_{m2})}$$

which corresponds to each of said partial fraction of the second term of said Formula 1.

2. An active CR two-terminal circuit as claimed in claim 1, wherein at least one of said plurality of partial two-terminal impedance circuits has a series circuit of a resistance element having a value of $$\frac{1}{A}R_0$$

A representing a coefficient, and a capacitance element having a value of $$\frac{A}{\gamma R_0}$$

$\gamma$ representing a root of $p^2+a_{m1}p+a_{m2}$, when $a_{m1}^2>4a_{m2}$ in said Formula 1.

3. An active CR two-terminal circuit as claimed in claim 1, wherein at least one of said plurality of partial two-terminal impedance circuits has a series circuit composed of a resistance element having a value of $$\left|\frac{1}{A}R_0\right|$$

and a capacitance element having a value of $$\left|\frac{A}{\gamma R_0}\right|$$

A representing a coefficient and $\gamma$ representing a root of $p^2+a_{m1}p+a_{m2}$ and a negative impedance conversion circuit the output of which is connected to said series circuit when A is negative.

4. An active CR two-terminal circuit as claimed in claim 1, wherein at least one of said plurality of partial two-terminal impedance circuits has a series circuit which is composed of a resistance element having a value of $$R_2=\frac{R_0}{\beta_{m1}}$$

and a capacitance element having a value of $$C_2=\frac{\beta_{m2}}{a_{m2}R_0}$$

and a parallel circuit which is composed of a parallel circuit of a resistance element having a value of $$R_3=\frac{\beta_{m1}}{\beta_{m2}}KR_0$$

and a capacitance element having a value of $$C_3=\frac{\beta_{m2}}{KR_0}$$

said series circuit and said parallel circuit being connected in series, where $$K=\left(\frac{\beta_{m2}}{\beta_{m1}}\right)^2-a_{m1}\left(\frac{\beta_{m2}}{\beta_{m1}}\right)+a_{m2}$$

when $a_{m1}^2<4a_m^2$ in said Formula 1.

5. An active CR two-terminal circuit as claimed in claim 1, wherein at least one of said plurality of two-terminal impedance circuits has a parallel circuit of a resistance element having a value of $|R_3|$ and $$R_3=\frac{\beta_{m1}}{\beta_{m2}}KR_0$$

a capacitance element having a value of $|C_3|$, $$C_3=\frac{\beta_{m2}}{KR_0}$$

a negative impedance conversion circuit the output of which is connected to said parallel circuit and a series circuit which is composed of a resistance element having a value of $|R_2|$, $$R_2=\frac{R_0}{\beta_{m1}}$$

and a capacitance element having a value of $|C_2|$, $$C_2=\frac{\beta_{m2}}{a_{m2}R_0}$$

and which series circuit is connected in series to the input of said negative impedance conversion circuit, when both the $\beta_{m1}$ and $\beta_{m2}$ are positive, where $$K=\left(\frac{\beta_{m2}}{\beta_{m1}}\right)^2-a_{m1}\left(\frac{\beta_{m2}}{\beta_{m1}}\right)+a_2$$

when $a_{m1}<4a_{m2}$ in said Formula 1.

6. An active CR two-terminal circuit as claimed in claim 1, wherein at least one of said plurality of partial two-terminal impedance circuits has a series circuit composed of a resistance element having a value of $|R_2|$, $$R_2=\frac{R_0}{\beta_{m1}}$$

and a capacitance element having a value of $|C_2|$, $$C_2=\frac{\beta_{m2}}{a_{m2}R_0}$$

a negative impedance conversion circuit the output of which is connected to said series circuit and a parallel circuit of a resistance element having a value of $$R_3=\frac{\beta_{m1}}{\beta_{m2}}KR_0$$

and a capacitance element having a value of $$C_3=\frac{\beta_{m2}}{KR_0}$$

which parallel circuit is connected in series to the input of said negative impedance conversion circuit, when $\beta_{m1}<0$ and $\beta_{m2}<0$, where $$K=\left(\frac{\beta_{m2}}{\beta_{m1}}\right)^2-a_{m1}\left(\frac{\beta_{m2}}{\beta_{m1}}\right)+a_2$$

when $a_{m1}<4a_{m2}$ in said Formula 1.

7. An active CR two-terminal circuit as claimed in claim 1, wherein at least one of said plurality of partial two-terminal impedance circuits has a series circuit composed of a resistance element having a value of $$|R_3'|=|(1+A)R_3|R_3=\frac{\beta_{m1}}{\beta_{m2}}KR_0$$

A representing a coefficient and a capacitance element having a value of $$|C_3'|=\left|\frac{C_3}{A(1+A)}\right|C_3=\frac{\beta_{m2}}{KR_0}$$

a negative impedance conversion circuit the output of which is connected to said series circuit, a resistance element having a value of $$R_2=\frac{R_0}{\beta_{m1}}$$

which is connected in series to the input of said negative impedance convertor circuit and a capacitance element having a value of $$C_2=\frac{\beta_{m2}}{a_{m2}R_0}$$

which is connected in parallel to the input of said negative impedance convertor circuit, when $\beta_{m1}<0$ and $\beta_{m2}>0$, where $$K=\left(\frac{\beta_{m2}}{\beta_{m1}}\right)^2-a_{m1}\left(\frac{\beta_{m2}}{\beta_{m1}}\right)+a_2$$

when $\alpha_{m1}<4\alpha_{m2}$ in said Formula 1.

8. An active CR two-terminal circuit as claimed in claim 1, wherein at least one of said plurality of partial two-terminal impedance circuits has a series circuit which is composed of a resistance element having a value of $|R_3''|=|A(1+A)R_3|$, $$R_3=\frac{\beta_{m1}}{\beta_{m2}}KR_0$$

A representing a coefficient, and a capacitance element having a value of $$|C_3''|=\left|\frac{C_3}{(1+A)^2}\right| C_3=\frac{\beta_{m2}}{KR_0}$$

A representing a coefficient, a negative impedance conversion circuit the output of which is connected to said series circuit, a capacitance element having a value of $$C_2=\frac{\beta_{m2}}{a_{m2}R_0}$$

which is connected in series to the input of said negative impedance conversion circuit, and a resistance element having a value of $R_2'=(1+A)R_3$, $$R_3=\frac{\beta_{m1}}{\beta_{m2}}KR_0$$

which is connected in parallel to the input of said negative impedance conversion circuit, when $\beta_{m1}>0$ and $\beta_{m2}>0$, where $$K=\left(\frac{\beta_{m2}}{\beta_{m1}}\right)^2-a_{m1}\left(\frac{\beta_{m2}}{\beta_{m1}}\right)+a_2$$

when $a_{m1}<4a_{m2}$ in said Formula 1.

9. An active CR two-terminal circuit comprising a plurality of series connected partial two-terminal admittance circuits at least one of which is composed of a resistance element, a capacitance element, and a negative impedance conversion circuit, and a conductance circuit, said partial two-terminal admittance circuits and said conductance circuit being respectively converted in duality from said partial two-terminal impedance circuit and said resistance circuit set forth in claim 1.

References Cited by the Examiner

UNITED STATES PATENTS

| | | | |
|---|---|---|---|
| 2,788,496 | 4/1957 | Linvill | 333—80 |
| 3,051,920 | 8/1962 | Sandberg | 333—80 |
| 3,068,329 | 12/1962 | De Monte et al. | 333—80 X |
| 3,112,463 | 11/1963 | Saraga | 333—80 |

FOREIGN PATENTS

| | | | |
|---|---|---|---|
| 56,181 | 6/1952 | France. | |

HERMAN KARL SAALBACH, *Primary Examiner.*

P. L. GENSLER, *Assistant Examiner.*